(12) United States Patent
Bailey

(10) Patent No.: US 10,631,587 B2
(45) Date of Patent: Apr. 28, 2020

(54) SAFETY HELMET

(71) Applicant: Anton Aran Bailey, Staffordshire (GB)

(72) Inventor: Anton Aran Bailey, Staffordshire (GB)

( * ) Notice: Subject to any disclaimer, the term of this patent is extended or adjusted under 35 U.S.C. 154(b) by 0 days.

(21) Appl. No.: 15/761,526

(22) PCT Filed: Sep. 23, 2016

(86) PCT No.: PCT/IB2016/055703
§ 371 (c)(1),
(2) Date: Mar. 20, 2018

(87) PCT Pub. No.: WO2017/051371
PCT Pub. Date: Mar. 30, 2017

(65) Prior Publication Data
US 2019/0053562 A1 Feb. 21, 2019

(30) Foreign Application Priority Data
Sep. 25, 2015 (GB) .................................. 1516974.1

(51) Int. Cl.
*A42B 3/04* (2006.01)
*A42B 3/06* (2006.01)
*B60Q 1/26* (2006.01)

(52) U.S. Cl.
CPC ............ *A42B 3/044* (2013.01); *A42B 3/0433* (2013.01); *A42B 3/0453* (2013.01); *A42B 3/0466* (2013.01); *A42B 3/066* (2013.01); *B60Q 1/2676* (2013.01)

(58) Field of Classification Search
CPC .................. A42B 3/0433–0466; B60Q 1/2676
See application file for complete search history.

(56) References Cited

U.S. PATENT DOCUMENTS

| 6,157,298 A | 12/2000 | Garfinkel et al. |
| 7,121,676 B1 | 10/2006 | Kutnyak |
| 8,269,619 B2 * | 9/2012 | Lee ...................... A42B 3/0453 340/432 |

(Continued)

FOREIGN PATENT DOCUMENTS

| CN | 201854733 U | 6/2011 |
| DE | 29617877 U1 | 1/1997 |

(Continued)

OTHER PUBLICATIONS

GB Combined Search and Examination Report, GB1516974.1, dated Mar. 7, 2016.

(Continued)

*Primary Examiner* — Mariceli Santiago
(74) *Attorney, Agent, or Firm* — William H. Bollman

(57) ABSTRACT

A safety helmet for enhancing visibility to road users. The safety helmet has a plurality of lights which are operatively connected to a power supply; at least one motion sensor which detects a behavioural characteristic of the cyclist and provides input signals to a controller, the controller operates in accordance with an algorithm whereby the signals are processed to determine appropriate timing of activation of the lights, in dependence upon the behavioural characteristic detected; and wherein switching signals from the controller switch on the lights to indicate actual or intended direction of travel.

10 Claims, 7 Drawing Sheets

(56) References Cited

U.S. PATENT DOCUMENTS

| | | | |
|---|---|---|---|
| 8,350,486 B2* | 1/2013 | Bucalo | B60Q 1/2676 315/209 R |
| 8,807,778 B1* | 8/2014 | Latchman | A42B 3/0453 362/105 |
| 2004/0227628 A1* | 11/2004 | Burdick | A42B 3/0453 340/479 |
| 2005/0134439 A1 | 6/2005 | Moore et al. | |
| 2007/0147027 A1* | 6/2007 | Chuang | A42B 3/0453 362/106 |
| 2009/0021365 A1 | 1/2009 | Hurwitz | |
| 2009/0034238 A1 | 2/2009 | Hurwitz | |
| 2012/0320569 A1 | 12/2012 | Lu | |
| 2013/0114247 A1 | 5/2013 | Rigaud | |
| 2014/0118129 A1* | 5/2014 | Hutchens | A42B 3/0453 340/432 |
| 2014/0210609 A1* | 7/2014 | Yang | B60Q 1/2676 340/463 |
| 2016/0144773 A1* | 5/2016 | Alataas | B60Q 1/2676 340/475 |
| 2016/0185280 A1* | 6/2016 | Coles | B60Q 1/2676 340/432 |
| 2017/0066492 A1* | 3/2017 | Arkhangelskiy | B60Q 1/2676 |
| 2017/0119078 A1* | 5/2017 | Chen | A42B 3/044 |

FOREIGN PATENT DOCUMENTS

| | | |
|---|---|---|
| GB | 2363314 A | 12/2001 |
| GB | 2397372 A | 7/2004 |
| GB | 2433415 A | 6/2007 |
| KR | 101470238 B1 | 8/2014 |

OTHER PUBLICATIONS

GB Examination Report, GB1516974.1, dated Aug. 11, 2016.
International Search Report, PCT/IB2016/055703, dated Dec. 15, 2016.

* cited by examiner

SAFETY HELMET

FIELD OF THE INVENTION

The present invention relates to a safety helmet, in particular the invention relates to a safety helmet for enhancing visibility of road users; more particularly, but not exclusively, the invention enhances the visibility of cyclists.

BACKGROUND

Cyclists on roads can be overlooked by drivers which can result in injuries and fatalities. This is partly because they are not always seen and partly because their intended actions or direction of travel are not always appreciated by other road users.

PRIOR ART

Chinese utility model CN 201 854 733 (PENGBIN) discloses a bicycle helmet for use at night or in low light levels.

U.S. Pat. No. 7,695,156 (HURWITZ) discloses an illuminated helmet which includes a plurality of transparent displays and opaque sections dispersed on its outer surface.

European patent application EP-A-1 589 842 (SHERRING) discloses an electroluminescent position indicator for mounting on a helmet.

CN201854733U (LIU) discloses a helmet whose front edge is provided with an illumination lamp, a groove behind the lamp and a back edge caution light.

DE29617877U (HERRMANN et al) discloses a helmet with integrated indicators on the left and right to indicate direction of travel.

GB2363314A (GARFORTH-BLES) discloses a safety hat with a light system.

GB2397372A (SHERRING) discloses a position indicator for a helmet.

GB2433415A (CHUANG) discloses a safety helmet and a direction indicating device mounted on the helmet body.

U.S. Pat. No. 6,157,298 (GARFINKEL) discloses a one or two-piece safety helmet.

U.S. Pat. No. 7,121,676B1 (KUTNYAK) discloses an illuminated protective headgear.

US2009034238A1 (HURWITZ) discloses an omnidirectionally illuminated helmet that emits light along a substantial portion of a helmet surface.

US2013114247A1 (RIGUAD et al) discloses a method for light up a luminous safety accessory.

Lumos, a next generation cycle helmet published on Kickstarter at https://www.kickstarter.com/projects/819484536/lumos-a-next-generation-bicycle-helmet discloses a cycle helmet with integrated lights and a switch mounted on handlebars to control the lights.

The present invention arose in order to overcome drawbacks of existing helmets and provides an improved cyclist's helmet.

SUMMARY OF THE INVENTION

According to a first aspect of the present invention there is provided a safety helmet for a cyclist which includes: a plurality of lights which are operatively connected to a power supply; at least one motion sensor which detects a behavioural characteristic of the cyclist and provides input signals to a controller, the controller operates in accordance with an algorithm whereby the signals are processed to determine appropriate timing of activation of the lights, in dependence upon the behavioural characteristic detected; and wherein switching signals from the controller switch on the lights in a sequence to indicate actual or intended direction of travel.

Preferably sets or groups of lights are positioned on the left and right hand sides of the helmet and these sets of lights are hereinafter referred to as side lights.

Ideally the safety helmet also includes front and rear facing lights which may also be configured to receive switching signals from the controller so that they are switched to indicate actual or intended direction of travel or a change in speed of travel.

Alternatively, one of, or both the front and rear lights may be arranged to operate independently of the controller. For example, each or both the front and rear lights may be activated by an independent switch.

Ideally the side lights are switched in sequence or are switched to flash or strobe in a particular manner or sequence. Preferably the side lights include a plurality of at least three separate lights arranged to illuminate as a sequence of flashing lights in a controllable manner. The speed of sequential switching of lights may be user defined. Optionally the number of times sequential switching and/or flashing or strobing of lights are repeated, may also be user defined.

Preferably the device is incorporated in a safety helmet for cyclists or the device may be supplied as a kit for retro-fitting to a cycle helmet. Components of the kit and support means being shaped and formed appropriately so as to enable the device to be connected permanently to a cycle helmet or temporarily fitted thereon.

Ideally the lights include light emitting diodes (LEDs) or laser LEDs which are preferably arranged on the side, front and back of the helmet so the cyclist can be clearly seen from all directions, thereby enhancing the visibility of the cyclist to other road users and third parties.

In another embodiment the side lights may be formed in the shape of an arrow or arranged in a manner to indicate direction of travel. One way this is achieved is, for example wherein adjacent side lights are formed so as to taper or are shaped in a manner to suggest or indicate movement or intended direction of travel. For example in some embodiments the side lights may comprise arrows pointing or flashing or strobing in the direction or intended direction of travel of the wearer of the device, so as to clearly communicate this to other road users, especially in low light or in the dark.

In this way the side lights may advantageously indicate to fellow travelers or pedestrians that the cyclist is moving or is intending to move in a specific direction, thereby alerting third parties to the presence of the cyclist. Because of the bright nature of the lights and the fact there is movement, the invention is quickly and easily spotted and distinguished from other background lights, signs and traffic, so as to alert other road users—in particular drivers of vehicles—that the wearer is present and may present a hazard. This tends to prompt immediate evasive action as well as causes motorists to reduce their speed.

Furthermore as the side lights are preferably arranged to extend around the helmet, when activated, other road users are able to see the lights from a distance. In one embodiment where the lights extend around substantially the entire helmet, other road users and drivers can perceive the strobing or flashing from any direction of approach. In this embodiment the flashing or strobing may be activated to traverse around the helmet presenting a display viewable from all sides and directions of approach.

The front illumination means may be directed forward so as to alert third parties or oncoming traffic of the presence of the user. Optionally the front illumination means may be directed downwards so as to illuminate the direction of travel of the wearer.

The front light may comprise means to adjust direction of illumination. In some embodiments the front illumination means may comprise means to adjust the width of a beam.

Optionally the rear light may be arranged so as to provide a hazard warning light to vehicles approaching from the rear and may include a further apparatus to attract attention. Such apparatus may for example comprise retro-reflective portions at or adjacent the rear light, or intermittent, flashing or otherwise variable light effects. For example in some embodiments the rear light may be of a different colour to the side lights and/or the front light.

Optionally front, rear and side lights are powered by separate batteries. This provides greater redundancy should a battery fail.

A means may be provided to enable the user to vary brightness of one or more of the lights. Likewise a means may be provided to enable a user to vary one or more features of the device so that the strobing sequence, refresh rate, brightness and/or colour of lights can be varied, for example according to preference, power needs and/or other specific requirements.

The rear light may operate in response to behavioural characteristics so that when a user is braking and therefore slowing down the rear lights are activated to indicate a change in speed. For example a sensor that detects speed and inclination of a user may provide input signals that are associated with braking ad thereby activate the rear light.

For example, in one embodiment an accelerometer may be included in the device which provides a separate signal to the controller indicative of the speed at which a cyclist is braking. This signal may be used to vary, for example, the brightness and/or colour of the lights so imparting to road users urgency associated with the motion of the cyclist.

The front illumination means may comprise a plurality of lights, for example a first directed or narrow beam is directed frontwards for third parties and a second diffused or wide beam light is directed downwards for illumination of a road surface for the benefit of the cyclist. Such plural lights may be provided with separate activation control.

In another embodiment the device may comprise a light sensor. The light sensor may be situated in order to capture ambient light levels. In this way the various lights may be arranged to activate automatically according to a preset ambient light level for maximum safety.

Advantageously activation control may comprise a motion sensor or accelerometer, which accelerometer may monitor speed of movement and divert power appropriately between lights.

In some embodiments the device may comprise a motion sensor and/or a magnetic compass. In this way the various lights may be arranged to be activated according to motion, for example individually according to detected travel conditions.

Ideally the motion sensor may allow the user to conserve battery power when not in movement, for example wherein the lights are provided with a delay and battery saver mode.

For example the motion sensor may allow the side lights to become activated or brightened or change colour or characteristics according to direction of the user's gaze. In this way when the user looks to one side in preparation for a turn, one or both of the side lights may be activated or made brighter and/or change colour so as to alert third parties of the imminent turn. For example a time delay built into the controller may prevent false positives. A cyclist's turn may be sensed and provide further characteristics for the side lights, for example wherein the side light provides a different characteristic for a time period after registering a prolonged period of directional change by the motion sensor.

In another embodiment the device includes a global or local positioning means. In this way the device may advantageously monitor local positioning of the cyclist, for example with reference to dangerous junctions, unsafe roads, so called 'accident black spots', or where ambient or street lighting conditions are poor or weather conditions may present a hazard. Advantageously such embodiments may be enabled to adjust the lights or characteristics or brightness thereof accordingly.

In some embodiments the device may include intermachine operability such as Bluetooth® so as to enable the cyclist to use electronic devices capabilities of smart phones or other devices in order to monitor conditions or mileage or status or usage of the lights.

Preferred embodiments of the invention will now be described, by way of example only, and with reference to the Figures in which:

DETAILED DESCRIPTION OF FIGURES

Figure 1A:
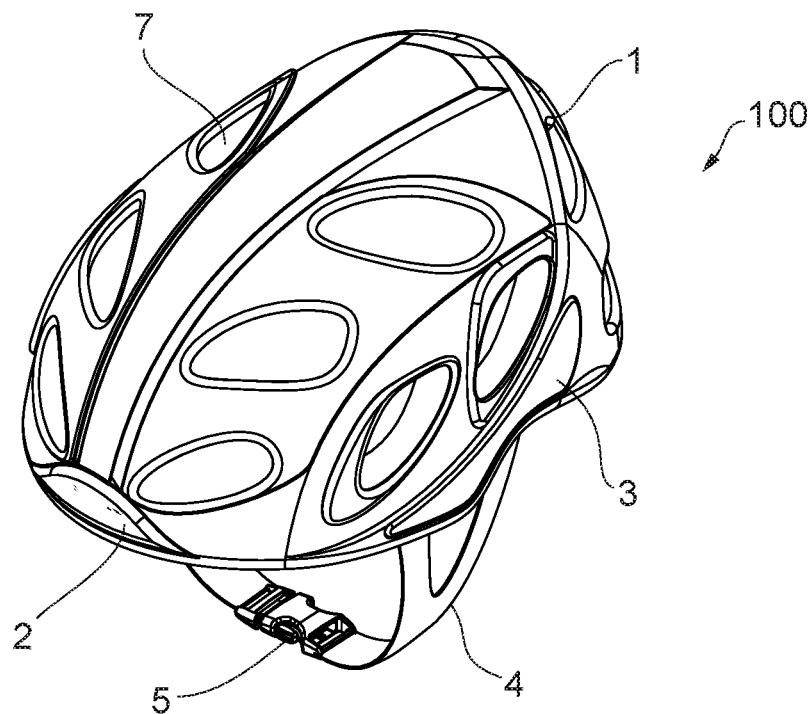
FIG. 1 show isometric views of an embodiment of the device according to the present invention.
Figure 1B:
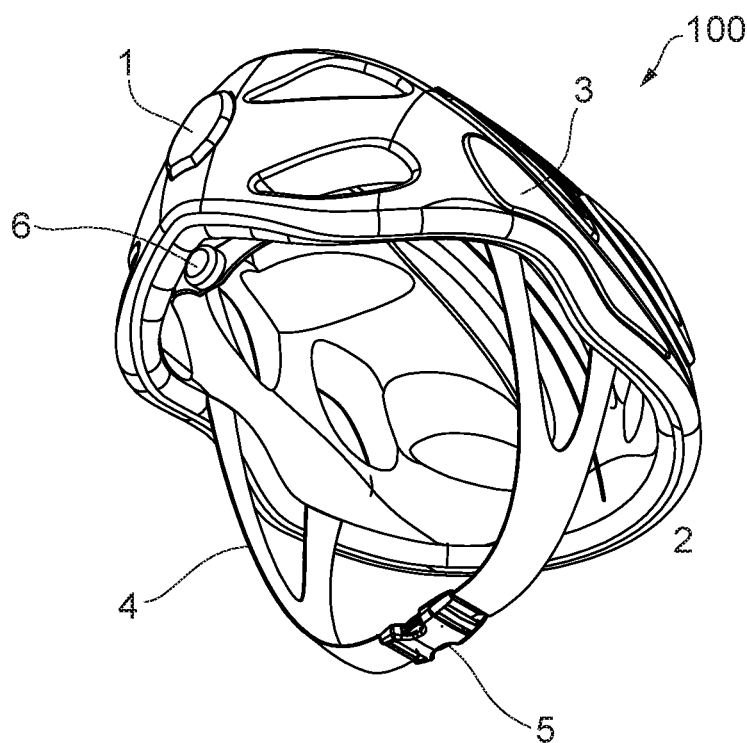
Figure 2A:
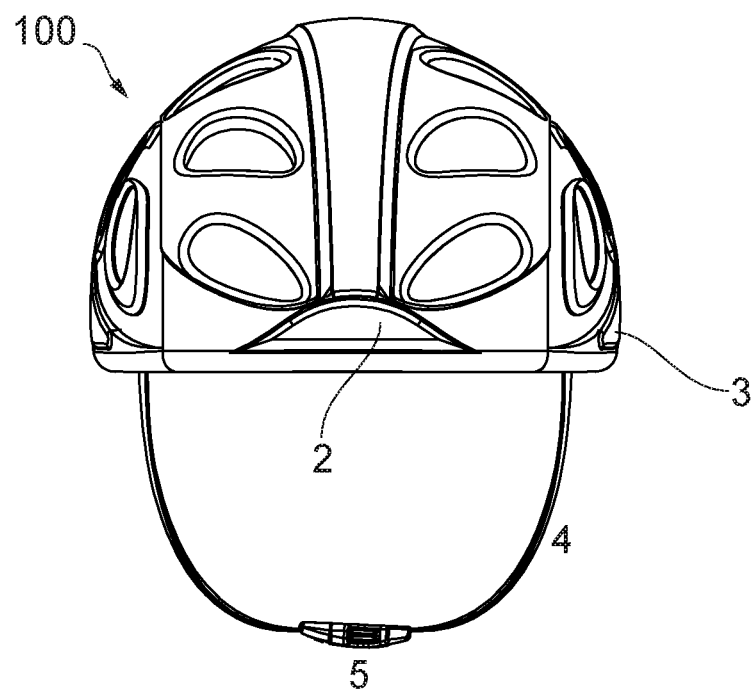
FIG. 2 show front and rear views of the embodiment shown in FIG. 1.
Figure 2B:
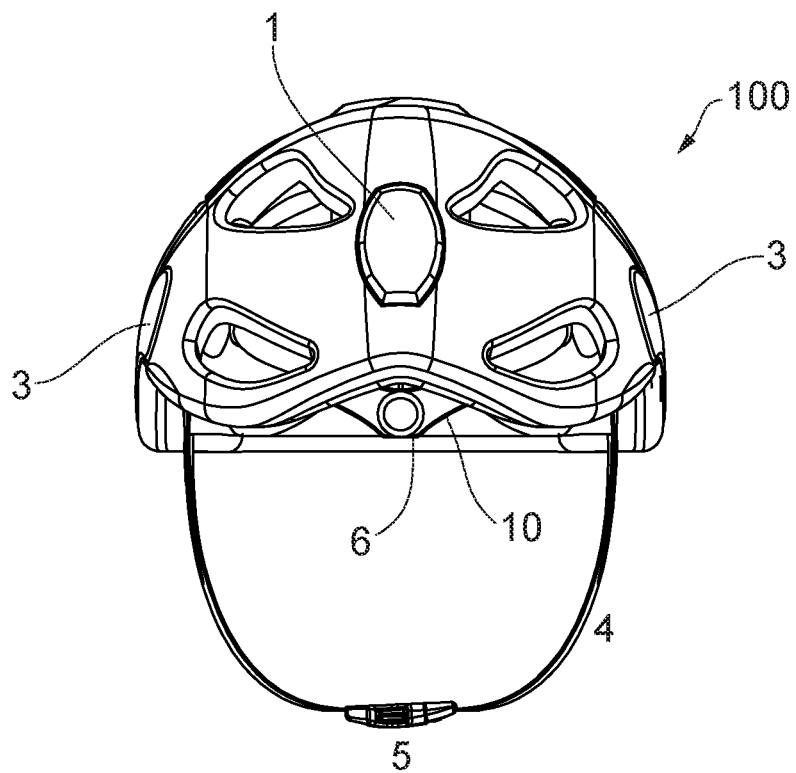

With reference to the Figures there is shown a helmet carcass 100 or helmet comprising a series of vents 7 which allow the passage of air to flow through the helmet in order to keep a cyclist cool.

The helmet carcass 100 is formed from a lightweight, robust synthetic plastics material and includes a core of expanded polystyrene.

The helmet 100 includes a front illumination means 2 which comprises a centrally located light emitting mechanism or circular cluster of light emitting diodes.

The helmet 100 includes a rear illumination means 1 that is a centrally located light emitting diode or a cluster of light emitting diodes.

The helmet includes side lights 3 on the left and right side of the helmet 100.

The front illumination means 2 can also be used to activate and de-activate all lights on the device wherein a switch is included in the front illumination means housing.

This enables the lights to be activated so that they are lit, for example in response to a signal.

The front 2 and rear 1 illumination means/lights may be controlled independently of the side lights 3. In this way, for example the front and rear lights are activated and remain lit through duration of use of the helmet 100. The side lights 3 are activated in response to behavioural characteristics.

Figure 3A:
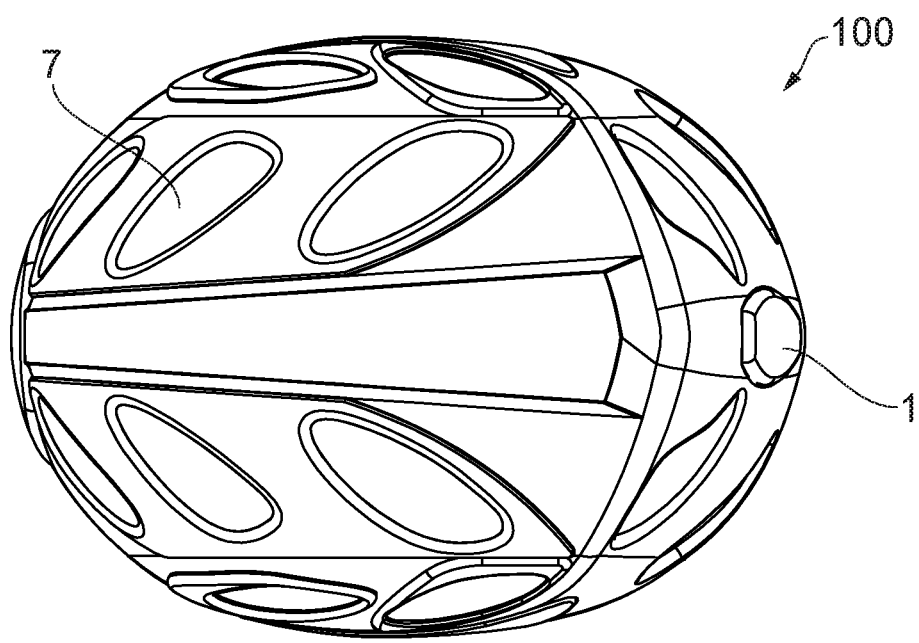
FIG. 3 show plan views of the embodiment shown in FIG. 1.
Figure 3B:
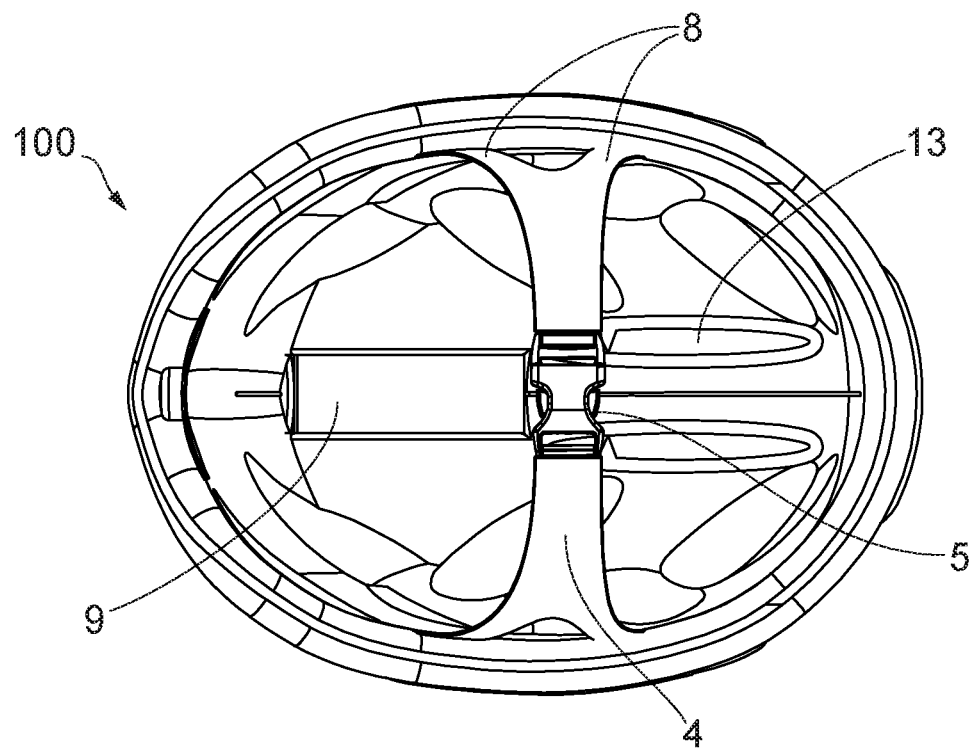
Figure 4:
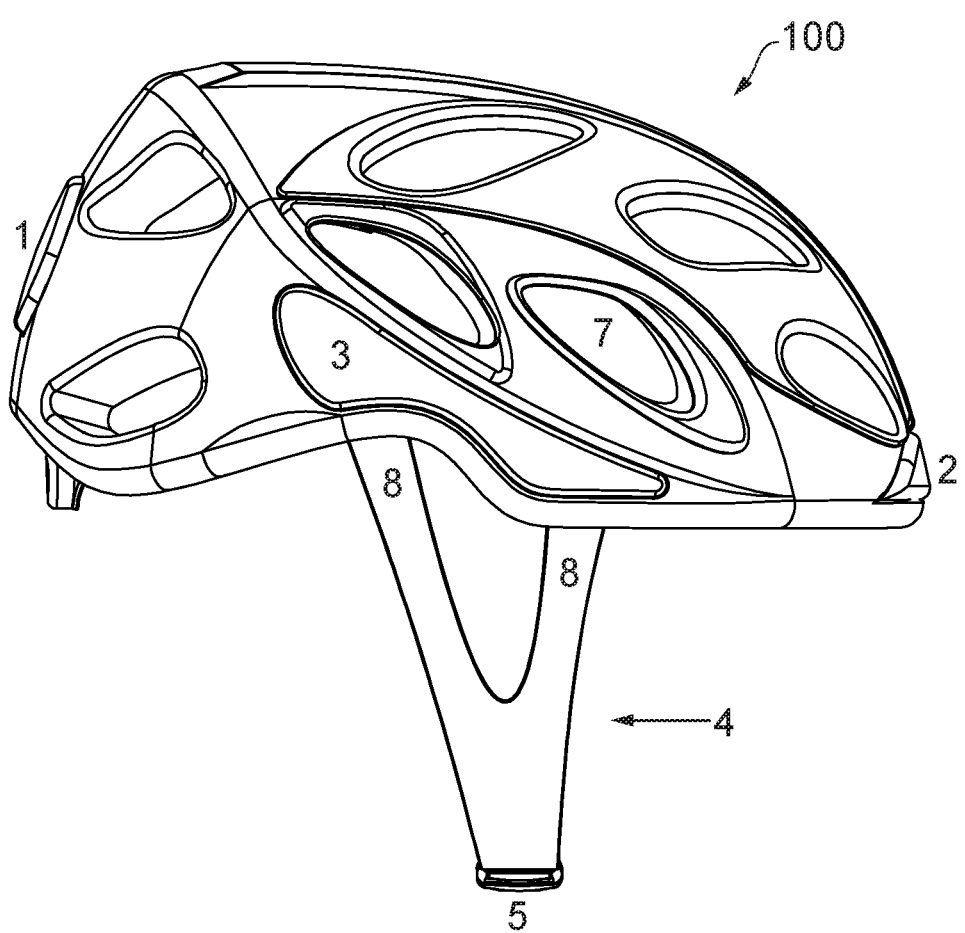
FIG. 4 shows a side view of the embodiment shown in FIG. 1.
Figure 5:
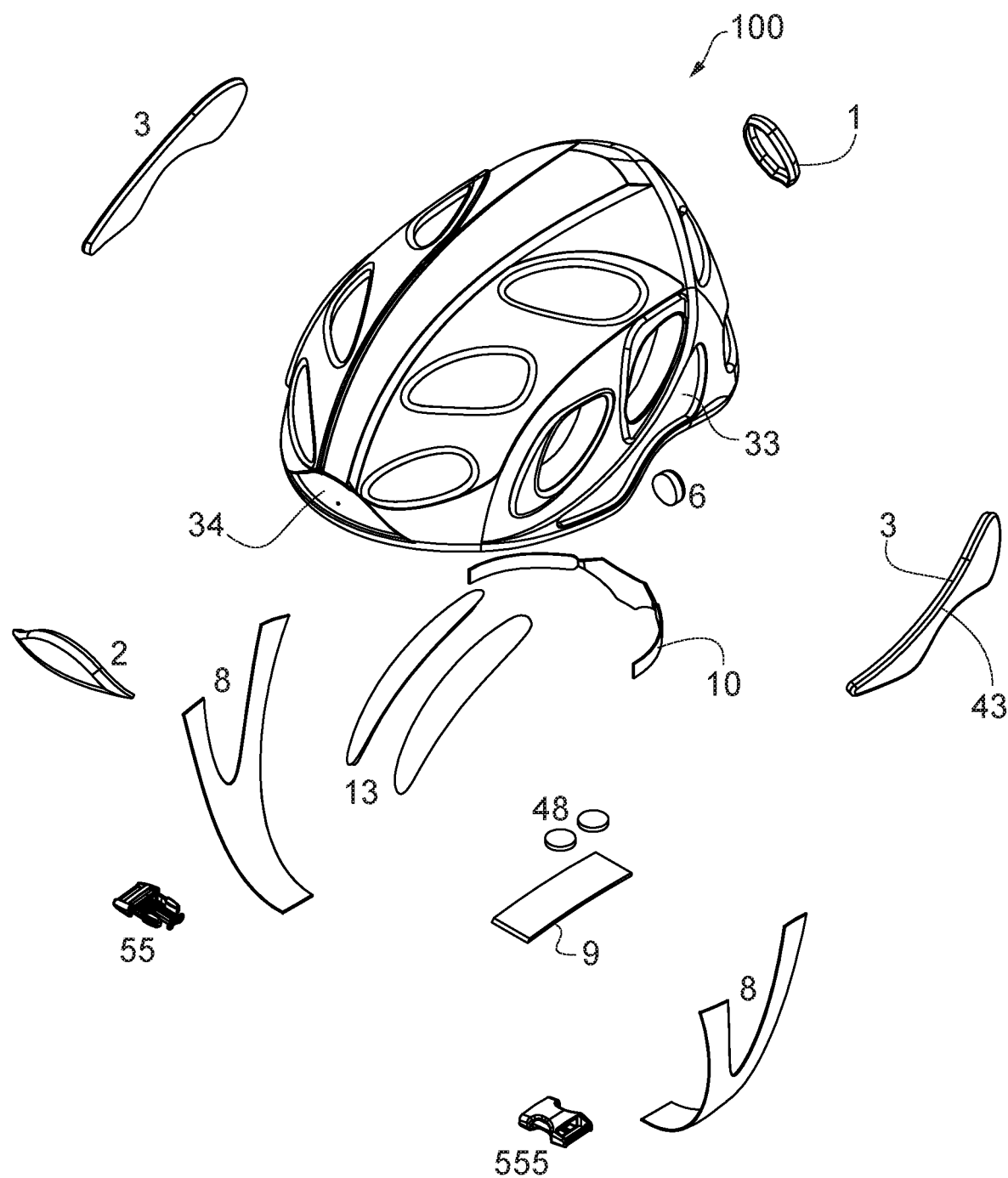
FIG. 5 shows an exploded isometric view of the embodiment shown in FIG. 1.
Figure 6:
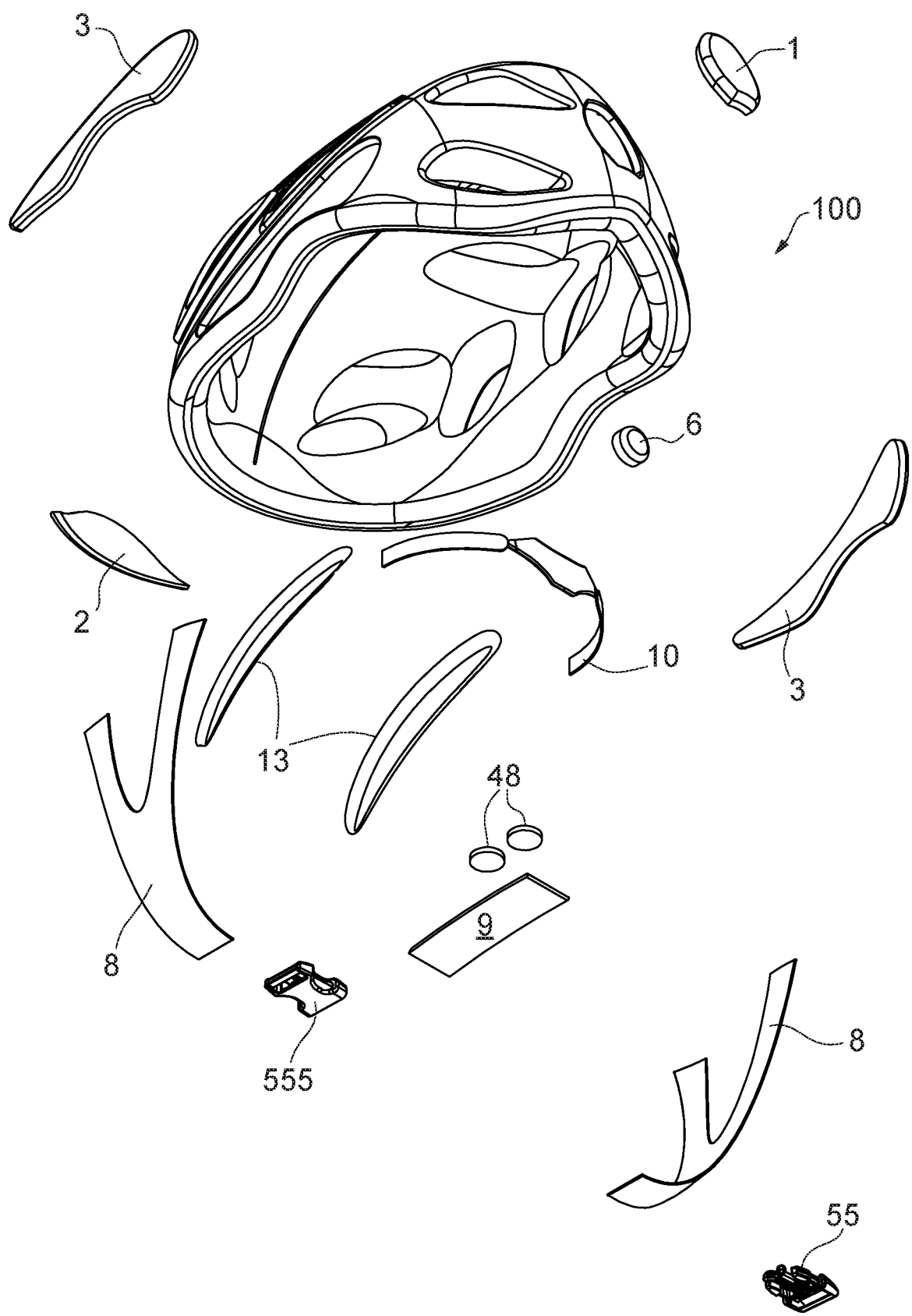
FIG. 6 shows an exploded isometric view of the embodiment shown in FIG. 1.

The lights are connected to a controller 9 includes an electronics panel, microchip and printed circuit board. The controller is mounted on an inner face of the helmet 100 (see FIG. 3B).

The controller 9 and lights 1, 2, 3 are connected to the power supply 48. The power supply is coin cell batteries.

The printed circuit board is also connected to, or includes a controller (not shown in FIGS. 1 to 6) and at least one motion sensor (not shown in FIGS. 1 to 6).

The motion sensors detect movements that indicate behavioural characteristics of the cyclist. The sensor(s) generate input signals that are passed to the controller to indicate the behavioural characteristics that have been detected.

The input signals are interpreted by the controller in accordance with an algorithm such that the signals processed determine the timing at which the lights are activated.

It is appreciated that each of the lights 1, 2, 3 may be activate in accordance with a different algorithm. For example, the side lights may be activated by behaviour characteristics associated with turning and the rear light may be activated with characteristics associated with a decrease in speed over the ground.

The controller is separated from the user's head by padding so as to prevent rubbing during use.

Additional padding 13 is provided on an inner face of the helmet 100 to also protect the user's head to provide enhances comfort and improved fit.

The padding provides an inner liner that houses the controller inside a pocket. The padding prevents discomfort or risk of injury.

Head attachment means 4 comprise chin straps 8, adjustment dial 6 and adjustment straps 10. This enables the helmet 100 to be fitted to a user.

Quick release fastener 5, comprising a resiliently deformable buckle 55 and catch 555.

A dial adjusts the fit of the device on the user's head, wherein a plurality of straps extend from the dial and are shortened as the dial is turned.

The coin cells and the controller 9 operate and power the lights 1, 2, 3. The coin cells and controller are located in the cavity of the helmet carcass.

The lights are located in and removable from friction, interference or tolerance fitting holders 33, 34 and 35 (see FIG. 5), such that the lights are enabled to pop out during impact so as to reduce injury to the cyclist. Additionally, or alternatively such fitting enables easy removal for maintenance or replacement and furthermore enables the user to easily disconnect the battery from quiescent draw.

Cables (not shown) run through channels (not shown) located on the inside of the helmet 100 to connect the lights 1, 2, 3 to the power source 48.

Batteries 48 have a life expectancy of approximately 7.5 hours before recharging is required.

A panel of LEDs are provided underneath a coloured, translucent cover to form the lights. In this way the same LEDs can be used for all lights.

The side lights are provided with intermittent flashing alert patterns to warn third parties of the cyclist's change of direction, improving visibility. The sequence of lighting indicates direction.

The side lights 3 comprise a plurality of light emitting diodes which are configured to remain activated at a low level when the accelerometer detects forward movement within a preset range of directional parameters.

The side lights 3 comprise an irregular shaped form, namely a translucent cover enlarging in size towards the rear of the device in use, and covering a plurality of light emitting diodes.

The light emitting diodes are diffused by the cover, and the cover traverses more than one plane of the carcass so as to be visible from a plurality of directions. The cover is shaped with an indentation 43 to encompass the over-ear shaping of the carcass so as to occupy a lowermost position on the carcass and comprise a substantially vertical plane so as to advantageously further enhance visibility.

Figure 7:
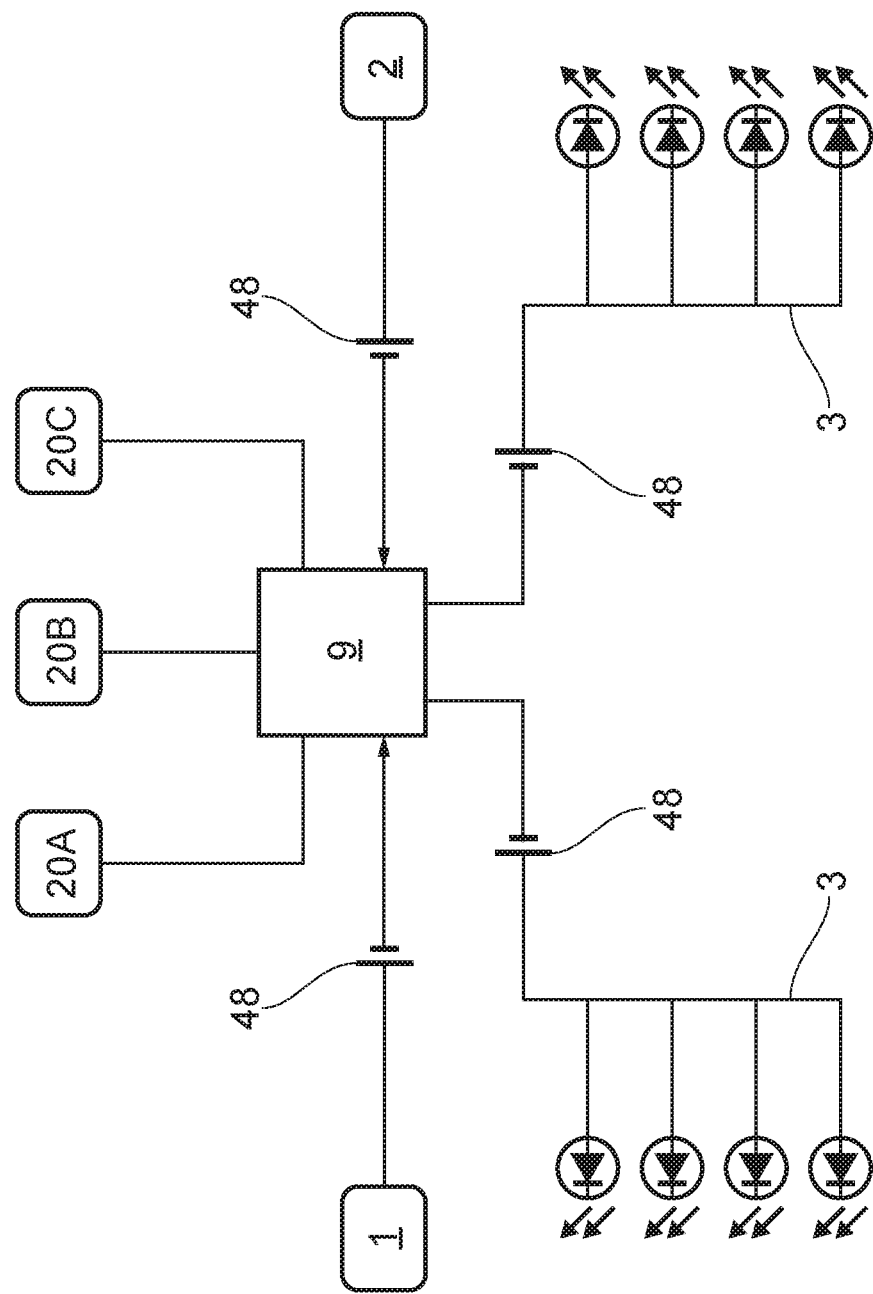
FIG. 7 shows an example of a circuit diagram for use in operating the lights.

FIG. 7 shows an example circuit diagram suitable for use in the helmet.

There are a plurality of sensors 20A, 20B, 20C. The sensors detect motion, such as speed and inclination. The sensors may be fitted on the helmet or arranged remotely such as on a user or on their bicycle. In such embodiments the sensors may communicate wirelessly with the controller 9.

The sensors 20A, 20B, 20C are connected to a controller 9 and the lights 1, 2, 3 are also connected to the controller.

Each light has its own battery 48 so that loss of one battery does not affect all lights.

The side lights 3 each have four light emitting diodes capable of being lit separately.

The invention has been described by way of examples only and it will be appreciated that variation may be made to the above-mentioned embodiments without departing from the scope of invention. Firstly it will be understood that any features described in relation to any particular embodiment may be featured in combinations with other embodiments.

With respect to the specification therefore, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention, with variation and implementation obvious and clear on the basis of either common general knowledge or of expert knowledge in the field concerned. Further, since numerous modifications and changes will readily occur to those skilled in the art, it is not desired to limit the invention to the exact construction and operation shown and described, and accordingly, all suitable modifications and equivalents may be resorted to, falling within the scope of the invention as set out in the accompanying claims.

The invention claimed is:

1. A safety helmet device for a cyclist which includes:
   a plurality of lights including a front illumination light, a rear-facing light, a plurality of right side lights, and a plurality of left side lights, which are operatively connected to a power supply; and
   at least one motion sensor which detects a behavioural characteristic of the cyclist and provides input signals to a controller, the controller operates in accordance with an algorithm whereby the input signals are processed to determine an appropriate time delay before activation of a first lighting characteristic for the plurality of right side lights and/or the plurality of left side lights, in dependence upon the behavioural characteristic detected, and thereafter a timing for activation of a second lighting characteristic different from the first lighting characteristic for the plurality of right side lights and/or the plurality of left side lights for a time period after registering a prolonged period of directional change indicated by the at least one motion sensor;

wherein switching signals from the controller switch on the plurality of right side lights and/or the plurality of left side lights as a sequence of lights to indicate actual or intended direction of travel.

2. The safety helmet device according to claim 1 wherein the plurality of left side lights and the plurality of right side lights extend around substantially an entire circumference of the helmet.

3. The safety helmet device according to claim 1 wherein the plurality of lights include light emitting diodes (LEDs) or laser LEDs.

4. The safety helmet device according to claim 1, further including a global positioning (GPS) sensing means.

5. The safety helmet device according to claim 1, further including an accelerometer arranged to sense a rate of braking, and to provide a signal indicative of the rate of braking in order to affect a variation to light colour and/or brightness of at least some of the plurality of lights.

6. The safety helmet device according to claim 1 wherein the plurality of lights are detachably fitted to the helmet.

7. The safety helmet device according to claim 1, further including an ambient light sensor which is adapted to activate the plurality of lights at a pre-set light level.

8. The safety helmet device according to claim 1, further including a compass in communication with the controller.

9. The safety helmet according to claim 1 wherein the plurality of lights, the at least one motion sensor and the controller are supplied as a kit for attaching to a cycle helmet, the safety helmet device further including: a support means shaped and formed appropriately so as to enable the safety helmet device to be connected to the cycle helmet.

10. A safety helmet device for a cyclist which includes:

a plurality of separately-powered lights which are operatively connected to separate power supplies, the plurality of separately-powered lights being adapted for separate mounting to a helmet at at least four different circumferential positions; and at least one motion sensor which detects a behavioural characteristic of the cyclist and provides input signals to a controller, the controller operates in accordance with an algorithm whereby the input signals are processed to determine an appropriate time delay before activation of a first lighting characteristic for the plurality of separately-powered lights, in dependence upon the behavioural characteristic detected, and thereafter a timing for activation of a second lighting characteristic different from the first lighting characteristic for the plurality of separately-powered lights for a time period after registering a prolonged period of directional change indicated by the at least one motion sensor;

wherein switching signals from the controller switch on the plurality of separately-powered lights in sequence to indicate actual or intended direction of travel.

* * * * *